(12) United States Patent
Habben et al.

(10) Patent No.: US 7,197,621 B2
(45) Date of Patent: Mar. 27, 2007

(54) FAST SEARCH ALGORITHM FOR DATA SORTING IN CHAINED LISTS

(75) Inventors: Hartmut Habben, Hamburg (DE); Peter Hank, Hamburg (DE)

(73) Assignee: NXP B.V., Eindhoven (NL)

(*) Notice: Subject to any disclaimer, the term of this patent is extended or adjusted under 35 U.S.C. 154(b) by 197 days.

(21) Appl. No.: 10/409,437

(22) Filed: Apr. 8, 2003

(65) Prior Publication Data

US 2003/0225983 A1    Dec. 4, 2003

(30) Foreign Application Priority Data

Apr. 10, 2002   (DE)   ................ 102 15 719

(51) Int. Cl.
*G06F 17/30*   (2006.01)

(52) U.S. Cl. .......... 711/209; 707/101; 707/3; 707/102; 711/207

(58) Field of Classification Search ........... 707/100, 707/200; 711/209
See application file for complete search history.

(56) References Cited

U.S. PATENT DOCUMENTS

| | | | | |
|---|---|---|---|---|
| 5,671,406 A * | 9/1997 | Lubbers et al. | ................ | 707/7 |
| 5,715,455 A * | 2/1998 | Macon et al. | ................ | 707/205 |
| 5,850,395 A * | 12/1998 | Hauser et al. | ............... | 370/398 |
| 5,860,074 A * | 1/1999 | Rowe et al. | ................. | 715/526 |
| 6,338,115 B1 * | 1/2002 | Galbraith et al. | ........... | 711/113 |
| 6,477,612 B1 * | 11/2002 | Wang | ............................ | 711/2 |
| 6,754,795 B2 * | 6/2004 | Chen et al. | .................. | 711/170 |
| 6,848,033 B2 * | 1/2005 | Joseph | ........................ | 711/147 |
| 2002/0095421 A1 * | 7/2002 | Koskas | ....................... | 707/100 |
| 2003/0018689 A1 * | 1/2003 | Ramakrishnan | ............. | 709/104 |
| 2004/0167923 A1 * | 8/2004 | Carr | .......................... | 707/102 |
| 2005/0055529 A1 * | 3/2005 | Lubbers et al. | ............. | 711/203 |

OTHER PUBLICATIONS

Walter Savitch, "Problem Solving With C++", 2001 Addison-Wesley, 3rd ed., pp. 813-820.*

Gerald Bozman, "The software lookaside buffer reduces search overhead with linked lists", Mar. 1984, Communications of the ACM, vol. 27, Issue 3, pp. 222-227.*

* cited by examiner

*Primary Examiner*—Brian R. Peugh
*Assistant Examiner*—Jesse Diller
(74) *Attorney, Agent, or Firm*—Kevin H. Fortin

(57) ABSTRACT

A data memory for storing elements, which data memory stores the data of the elements and at least a chained list which contains, for each stored element, at least its element address, its element number and a pointer to the address of the stored element having the next-higher element number. There are also provided an element status table, in which the element numbers of the elements present in the data memory are taken up, and also an address reference table which contains the element addresses for all element numbers.

20 Claims, 3 Drawing Sheets

| A | N | D | P |
|---|---|---|---|
| 0 | 10 | | 8 |
| 4 | 15 | | 12 |
| 8 | 12 | | 4 |
| 12 | 18 | | 20 |
| 16 | 8 | | 24 |
| 20 | 20 | | |
| 24 | 9 | | 0 |

| A | N | D | P |
|---|---|---|---|
| 0 | 10 |  | 8 |
| 4 | 15 |  | 12 |
| 8 | 12 |  | 4 |
| 12 | 18 |  | 20 |
| 16 | 8 |  | 0 |
| 20 | 20 |  |  |
| 24 |  |  |  |

FIG. 1

| (15) | 14 | 13 | (12) | 11 | (10) | 9 | (8) | 7 | 6 | 5 | 4 | 3 | 2 | 1 | 0 |
|---|---|---|---|---|---|---|---|---|---|---|---|---|---|---|---|
| 31 | 30 | 29 | 28 | 27 | 26 | 25 | 24 | 23 | 22 | 21 | (20) | 19 | (18) | 17 | 16 |
| n |  |  |  |  |  |  |  |  |  |  |  |  |  | 33 | 32 |

FIG. 2

| $N_{R'}$ | $A_R$ |
|---|---|
| 0 | xx |
| 1 | xx |
| 2 | xx |
|  |  |
| 8 | 16 |
| 9 | xx |
| 10 | 0 |
| 11 | xx |
| 12 | 8 |
|  |  |
| 15 | 4 |
|  |  |
| 18 | 12 |
|  |  |
| 20 | 20 |
|  |  |
| n |  |

FIG. 3

| A | N | D | P |
|---|---|---|---|
| 0 | 10 |  | 8 |
| 4 | 15 |  | 12 |
| 8 | 12 |  | 4 |
| 12 | 18 |  | 20 |
| 16 | 8 |  | 24 |
| 20 | 20 |  |  |
| 24 | 9 |  | 0 |

| A | N | D | P |
|---|---|---|---|
| 0 | 10 |  | 8 |
| 4 | 15 |  | 12 |
| 8 | 12 |  | 4 |
| 12 | 18 |  | 20 |
| 16 | 8 |  | 0 |
| 20 | 20 |  |  |
| 24 |  |  |  |

| $N_{R'}$ | $A_R$ |
|---|---|
| 0 | xx |
| 1 | xx |
| 2 | xx |
|  |  |
| 8 | 16 |
| 9 | xx |
| 10 | 0 |
| 11 | xx |
| 12 | 8 |
|  |  |
| 15 | 4 |
|  |  |
| 18 | 12 |
|  |  |
| 20 | 20 |
|  |  |
| n |  |

| (15) | 14 | 13' | (12) | 11 | (10) | 9 | (8) | 7 | 6 | 5 | 4 | 3 | 2 | 1 | 0 |
| 31 | 30 | 29 | 28 | 27 | 26 | 25 | 24 | 23 | 22 | 21 | (20) | 19 | (18) | 17 | 16 |
| n |  |  |  |  |  |  |  |  |  |  |  |  |  | 33 | 32 |

58, 56, 52, 54, 50

FAST SEARCH ALGORITHM FOR DATA SORTING IN CHAINED LISTS

The invention relates to a data memory for the storage of elements, the data of the elements and at least one chained list being stored in said data memory, which chained list contains, for each stored element, at least the element address thereof, the element number thereof and a pointer to the address of the stored element having the next-higher element number.

Data memories involving such type of storage of elements as well as a chained list are known and offer advantages in particular when the elements stored are to be read from the data memory again in a given, ordered manner. Because of the data stored in the chained list, notably because of the pointers, the elements can be comparatively easily found and read out in the sequence of their number.

Such a data memory and such a type of data storage of the elements in the data memory, however, have a serious drawback in that the searching and finding of individual data elements has been found to be difficult. This drawback becomes manifest notably when it is necessary to insert new elements which have an element number within the range of the already stored elements. In dependence on the number of elements already present in the list, a large number of comparisons and memory accesses is required; however, such a large number is not acceptable for many applications.

In addition to the described single chained list there are also so-called double chained lists in which, in addition to the successor element, the predecessor element is also stored. Granted, such double chained lists offer an improvement in respect of the search speed, but nevertheless they still require a considerable search effort as from a given length. Furthermore, they require additional storage space.

It is an object of the invention to further develop said data memory for the storage of elements as well as at least one chained list in a manner such that the localization of given elements in the data memory or the chained list is facilitated and hence new elements can be stored in the data memory and provided in the chained list with as little effort as possible.

In accordance with the invention this object is achieved as disclosed in claim 1 by means of a data memory for the storage of elements which stores the data of the elements and at least one chained list which contains, for each stored element, at least the element address thereof, the element number thereof as well as a pointer to the address of the stored element having the next-higher element number, there also being provided an element status table which contains the element numbers of the elements present in the data memory, and also an address reference table which contains the element addresses for all element numbers.

The elements, each having an element number, in principle are stored in an arbitrary location in the data memory. For example, they can be stored in the order of their arrival and their storage with an ascending order of addresses of the data memory. In order to localize the elements again there is provided a chained list which contains for each element its number, its element address in the data memory as well as a pointer to the address in the data memory of the stored element having the next-higher element number. The data of the elements and the chained list can be stored together or also in separate locations in the data memory.

As a result of the pointers, pointing to the element having the next-higher element address for each element, a kind of chaining of the elements is achieved. This is because the chain extends from the element having the lowest number to the element having the highest number, that is, in the order of the element numbers. This chain thus contains all elements stored in the data memory in the order of their element number. As has been stated before, this has nothing to do with the location of the storage in the data memory which may in principle be arbitrary for each element.

This chained list offers an advantage for the localization of an element, in particular when the elements are to be read out in the order of their element number, as is desirable for given applications.

In practice only given elements having given element numbers are stored at an arbitrary instant. Elements arriving later so as to be stored possibly have element numbers which are within the range of the already stored elements or their numbers. Therefore, when a new element having a new number is stored, this element must be inserted in the chained list and notably the pointers of the relevant elements in the chained list must be set again. When a search is performed in the chained list in a manner in conformity with the state of the art, a large number of comparisons and memory accesses will then be required; this is not acceptable for many applications.

Therefore, in accordance with the invention there are provided two further tables which facilitate the localization of a given element.

In addition to the chained list there is provided an element status table in which the element numbers of the elements present in the data memory are provided.

This element status table thus enables determination as to which elements or element numbers are already stored in the data memory. For example, for a new element to be inserted it can thus be determined which elements having the next-lower and next-higher element number are already present in the data memory. This facilitates the insertion of a new element in the chained list.

In accordance with the invention there is also provided an address reference table in which, for all elements and element numbers already stored, their element address in the data memory is provided.

This address reference table facilitates the localization of a given element having a given element number in the data memory, because the memory location of the element can be readily determined on the basis of this table.

The element status table as well as the address reference table thus enable comparatively simple determination, without unnecessary memory accesses to the chained list, as to which elements having which element numbers have already been stored and where they have been stored in the data memory.

This enables comparatively simple localization of a given element having a given element number. Furthermore, such tables facilitate the insertion of a new element in the chained list and the new setting of the pointers, because it is known which next-higher or next-lower element is present and where it is stored in the memory.

Apart from the access to the two tables, in the case of the data memory in accordance with the invention it is not necessary to carry out search operations in the data memory and in the chained list.

Claim 2 discloses an advantageous procedure for inserting a new element to be stored in the data memory and the chained list. Prior to the storage of a new element, a search is performed in the element status table for that already stored element which has the next-lower element number. The element having the next-lower number is then known from the element status table; the memory address thereof can also be simply localized in the data memory on the basis of the address reference table. After the storage of the new element in the chained list, the pointer of the newly stored element as well as that of the element having the next-lower element number can be correctly set on the basis of this knowledge, without further memory accesses being required.

The access to the element status table can be facilitated in a further embodiment of the invention as disclosed in claim 3 by associating exactly one bit with each element or each element number in this table. The existence of the already stored element numbers can be thus be demonstrated simply by checking the set bits in the element status table.

In conformity with a further embodiment of the invention as disclosed in claim 4, the chained list is a single chained list in which only the pointers pointing to the address of the element having the next-higher element number are provided.

Because of the simple localization offered in accordance with the invention, no double chained list is required as it no longer offers advantages over a single chained list which requires less storage space.

A further embodiment of the data memory in accordance with the invention as disclosed in claim 5 can be advantageously used for so-called data bus gateways. Such gateways buffer messages, corresponding to the elements, and distribute the messages in an ordered fashion to data bus subscribers. In this case the data memory in accordance with the invention, considering its specific memory structure and the possibility of ordered reading out of elements in conformity with the element number, offers special advantages.

An embodiment of the invention will be described in detail hereinafter with reference to the drawing. Therein:

FIG. 1 is a diagrammatic representation of a memory section of the data memory in accordance with the invention, together with the storage of the data of the elements as well as the chained list, FIG. 2 shows an element status table for the data memory shown in FIG. 1, FIG. 3 shows an address reference table for the data memory shown in FIG. 1, and FIG. 4 is a representation in conformity with FIG. 1, be it with a new element additionally provided in the chained list.

FIG. 5 is a data bus gateway employing a data memory section (with a chained list), together with a element status table and an address reference table.

FIG. 1 is a diagrammatic representation of a table showing how given elements, having given element numbers, are stored in a data memory which itself is not shown in the drawing.

The first column A of the table shown in FIG. 1 contains the memory addresses in the data memory. The rendition of FIG. 1 shows that each element occupies four memory addresses in the data memory.

The second column N in the table of FIG. 1 lists the numbers N of the elements already stored in the data memory. In the example shown in FIG. 1, elements having the numbers 8, 10, 12, 15, 18 and 20 have already been stored in the data memory.

The third column indicates that for each element the data D thereof has been stored in the data memory. This data is not indicated in FIG. 1.

The fourth column of FIG. 1 shows pointers P which, for each element already stored in the data memory, point to the address of the element having the next-higher element number. For example, the entry on the first line of the table of FIG. 1 indicates that for the element bearing the number 10 the pointer P equal to 8 has been entered. This is because the element having the next-higher element number is the element 12 stored at the memory address 8 of the data memory (this is shown on the third line of the table).

The data indicated in FIG. 1 is stored in the data memory. Such storage can take place either separately in such a manner that the data D is stored separately from the addresses A in the element numbers N and the pointers P. However, this data may also be stored together. The data of the addresses A, the element numbers N and the pointers P are also referred to as a chained list, because a chain of the elements ordered in conformity with their element number is obtained on the basis of this data.

The storage of elements in conformity with the representation shown in FIG. 1 in a data memory is known in principle. However, a problem is encountered in that when new elements are inserted, elements already present must be localized. This is because, when an element having a given element number is inserted, it is necessary to search the element having the next-lower element number from among the elements already stored, because the pointer thereof must be changed with a view to the new element to be inserted and its element number. To this end, search operations must be performed in the chained list, said operations necessitating a corresponding number of read accesses to the data memory. However, this is not desirable for given applications.

Therefore, in the data memory there are also stored an element status table as shown in FIG. 2 as well as an address reference table as shown in FIG. 3.

In the element status table shown in FIG. 2 each element number which might have to be stored in the data memory has a single bit. Thus, if a bit for a given element number in the element status table shown in FIG. 2 has been set, the element having this number has already been stored in the data memory. Conversely, this means that element numbers for which the corresponding bit has not yet been set in the element status table shown in FIG. 2 have not yet been stored in the data memory.

Thus, reading out the element status table shown in FIG. 2 enables simple determination as to which elements have already been stored in the data memory.

This is important because, as has already been explained, for the storage of each new element having a new element number it is necessary to determine which element having the respective lower element number has already been stored. This operation can be carried out in a simple manner by means of the element status table shown in FIG. 2.

Once the already stored element having the next-lower element number in relation to the new element to be stored has been determined, the respective address of this element can be determined in a simple manner by means of the address reference table shown in FIG. 3.

This is because the address reference table in accordance with FIG. 3 contains for each element number N index R its memory address A index R in the data memory. The representation in conformity with FIG. 3 shows, for the already stored elements indicated in the representation of FIG. 1, each time the memory address A index R at which the relevant element is stored in the data memory. The representation in conformity with FIG. 3 shows a symbol XX for those elements or element numbers which have not yet been stored; this reference means that possibly even older addresses have been stored which are no longer valid. However, this is not a nuisance, because from the data of the element status table of FIG. 2 it is known which elements are actually stored. The address reference table in conformity with FIG. 3 indicates the relevant memory location for such actually stored elements.

The address reference table of FIG. 3 thus enables the respective memory location to be found for an element found on the basis of the element status table.

The element status table and the address reference table are advantageous notably when an additional element is to be stored in the data memory and the pointers of this element and that of the already stored element having the next-lower element number have to be set again. This will be described in detail hereinafter with reference to FIG. 4.

FIG. 4 shows, in the same way as FIG. 1, elements stored in the data memory as well as the data of the chained list.

In the representation of FIG. 4, however, a further element having the element number 9 has been stored at the address 24 of the data memory. The pointer P of the element 9 points to the address 0, because the element having the next-higher element number, that is, the element bearing the number 10, is stored at the address 0 of the data memory. In comparison with the representation of FIG. 1, furthermore, the pointer of the element 8, that is, the element having the next-lower element number, has also been changed. This pointer must now point towards the newly stored element 9 or the memory address 24 thereof.

For the insertion of such an element a procedure in accordance with prior art would require various memory accesses, because it would have to be determined which element having the next-lower element number is present and where it is stored, and also which element having the next-higher element number is present and where it is stored.

In accordance with the invention this procedure is substantially simplified by the element status table of FIG. 2 and the address reference table of FIG. 3.

For example, if the element having the number 9 has to be stored as a new element as indicated in the example shown in FIG. 4, first it is checked in the element status table of FIG. 2 which element having the next-lower element number is stored. In the example shown in FIG. 2, this is the element number 8 whose bit has been set. This means that an element having the number 8 has already been stored in the data memory.

On the basis of the data of the address reference table in conformity with FIG. 3, it can now be simply determined where said element is stored. This is because the address reference table of FIG. 3 indicates the address storage number 16 for the element having the number 8. As appears from the FIGS. 1 and 4, the element having the number 8 is indeed stored at the address 16.

For this element the entry of the pointer P in the chained list must be changed accordingly, since this pointer must now point to the address 24 at which the newly stored element having the element number 9 has been stored.

The pointer P for the newly stored element 9 points towards the address 0, because the element having the next-higher element number, that is, the number 10 in this case, is stored at the address 0. The element status table and the address reference table can be advantageously used also for localizing this element having the next-higher number which must be known for the setting of the pointer of the new element to be stored.

To sum it up, it can be said that the availability of these two tables enables a substantial reduction of the number of search operations in comparison with prior art data memories. It is notably not necessary to perform a search in the chained list, because the necessary data can be determined directly by simply accessing these two tables.

The above disclosures have application in data bus gateways. Conventional data bus gateways are known that, generally, buffer data messages from various nodes, modules or other sources and distribute those data messages in some ordered fashion to data bus subscribers. The distribution in such conventional data bus gateways generally will follow a set of rules that set priority for the distribution of each received message. Examples of conventional data bus gateways are available in association with Controller Area Network (CAN) and FlexRay™ buses. The CAN bus is the subject of ISO 1898 standard directed to lower OSI layers, as well as numerous higher level protocols. In turn, the FlexRay™ bus is a de facto standard promulgated by the FlexRay Consortium particularly for bus systems in automobiles.

Turning to FIG. 5, a data bus gateway 50 is illustrated in block diagram form, which gateway employs a data memory section 52, together with an element status table 54 and an address reference table 56, as well as associated interface componentry 58. The data bus gateway 50 provides for buffering and distribution of data messages, wherein data messages correspond to elements of the data memory section 52, as such elements are described above with reference to FIGS. 1–4. The ordered distribution of data messages is advanced by storing the messages in the data memory via the chained list (e.g., the higher priority messages being taken up at or near the head of the list). As new data messages are received, these messages generally will have a priority which corresponds to the element number and, as such, the messages will be inserted in the linked list (e.g., so as to effect distribution in accord with that priority relative to the already present data messages).

The invention claimed is:

1. A data memory for the storage of elements, the data of the elements and at least one chained list being stored in said data memory, which chained list contains, for each stored element, the element number thereof and a pointer to the address of the stored element having the next-higher element number, there also being provided an element status table which contains the element numbers of the elements present in the data memory, and also an address reference table which contains the element addresses for all element numbers.

2. A data memory as claimed in claim 1, wherein prior to the storage of a new element, a search is performed in the element status table for the already stored element having the next-lower element number while the element address thereof is determined in the address reference table, and that after the storage of the new element its pointer in the chained list is set to the address of the element having the next-higher element number while the pointer of the element determined as having the next-lower element number is set to the address of the newly stored element.

3. A data memory as claimed in claim 1, wherein a respective, single bit is associated with each element in the element status table, each such bit indicating the presence of the corresponding element.

4. A data memory as claimed in claim 3, wherein the elements of the chained list are of a selected plurality that may be present or not, and wherein the element status table has, for each of the selected plurality of elements, a respective location for storing the bit indicating the presence or absence of the element.

5. A data memory as claimed in claim 1, wherein the chained list is a single chained list which contains the pointers which point only to the address of the element having the next-higher element number.

6. A data bus gateway for the buffering and ordered distribution of data elements, the data bus gateway comprising a data memory for the storage of the data elements as claimed in claim 1.

7. A data bus gateway as claimed in claim 6, further comprising interface componentry enabling compatibility with the ISO 1898 CAN bus.

8. A data bus gateway as claimed in claim 6, further comprising interface componentry enabling compatibility with automotive bus systems.

9. The data memory of claim 1, wherein the element status table includes a plurality of entries, one said entry corresponding to each of the elements, wherein each entry indicates whether or not the element is present in the data memory.

10. The data memory of claim 9, wherein prior to the storage of a new element, a search is performed in the element status table for the already stored element having the next-lower element number while the element address thereof is determined in the address reference table, and that after the storage of the new element its pointer in the chained list is set to the address of the element having the next-higher element number while the pointer of the element determined as having the next-lower element number is set to the address of the new element, and further that the entry in the element status table corresponding to the new element is changed to indicate that the new element is stored in the data memory.

11. A data memory for the storage of elements, the data memory comprising:
a data memory section, the data memory section storing elements in at least one chained list, which chained list contains, for each stored element, at least the element number thereof and a pointer to the address of the stored element having the next-higher element number;
an element status data structure, the element status data structure indicating the element numbers of the stored elements in the data memory section; and
an address reference data structure, the address reference data structure containing, associated with each respective one of the stored element numbers, the stored element address in the data memory section.

12. A data memory as claimed in claim 11, wherein the data memory section contains the data of the stored elements of the at least one chained list.

13. A data memory as claimed in claim 11, wherein the data memory section excludes the data of the stored elements of the at least one chained list.

14. A data memory as claimed in claim 11, wherein the element status data structure represents all possible element numbers, each such element number having at least one associated bit, so that, depending on the status of the at least one associated bit, each such element number is indicated to be present or absent in the data memory section.

15. A data memory as claimed in claim 14, wherein the element status data structure comprises a table.

16. A data memory as claimed in claim 14, wherein the element status data structure comprises a bit map.

17. A data memory as claimed in claim 11, wherein the address reference data structure comprises a table.

18. A data memory as claimed in claim 11, wherein the address reference data structure contains the data, in association with respective element numbers, of the elements of the chained list that are present in the data memory section.

19. A data memory for the storage of elements, the elements having a selected plural number, and the data memory storing at any given time one or more of the selected plural number, comprising:
a data memory section, the data memory section storing one or more of the selected plural number of elements in at least one chained list, which chained list contains, for each stored element, at least the element number thereof and a pointer to the address of the stored element having the next-higher element number or, if there is no stored element having the next-higher element number, a null entry; and
an element status data structure, the element status data structure having, for each of the selected plural number of elements, a location for storing a respective bit, the location being associated with each element's element number and the bit's value indicating whether the element is present in the chained list.

20. A data memory for the storage of elements as claimed in claim 19, further comprising an address reference data structure, the address reference data structure containing, associated with each element number of elements present in the chained list, an address of each such element.

* * * * *